May 15, 1928.  1,670,013
R. WILLIAMS
MEANS FOR CENTRIFUGALLY MOLDING CONCRETE AND OTHER PIPES
Filed Feb. 19, 1925  3 Sheets-Sheet 1
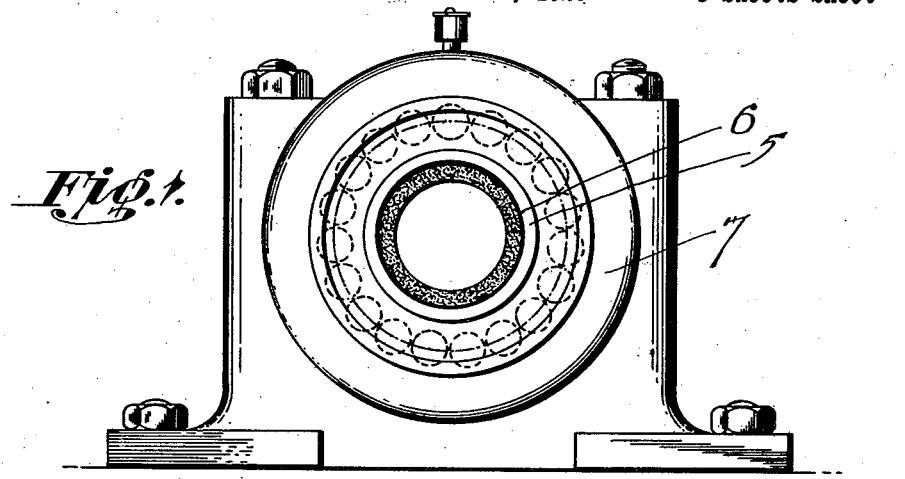
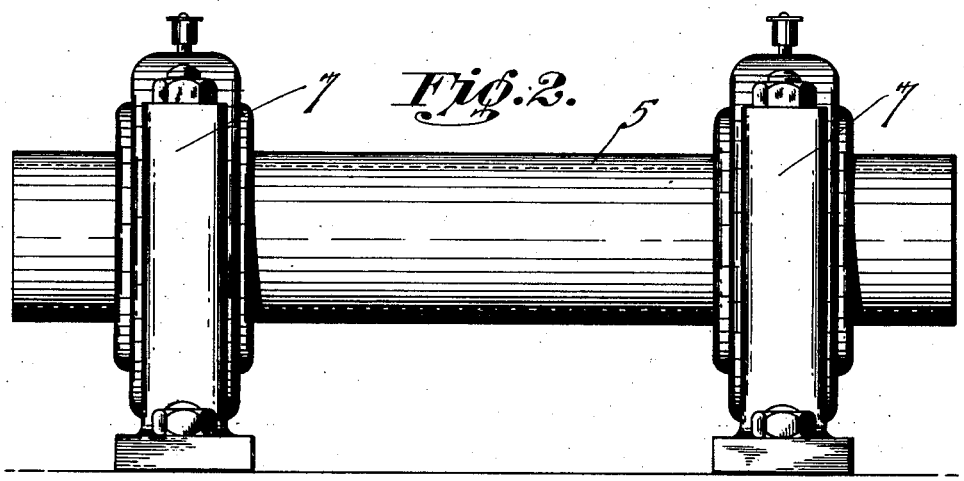
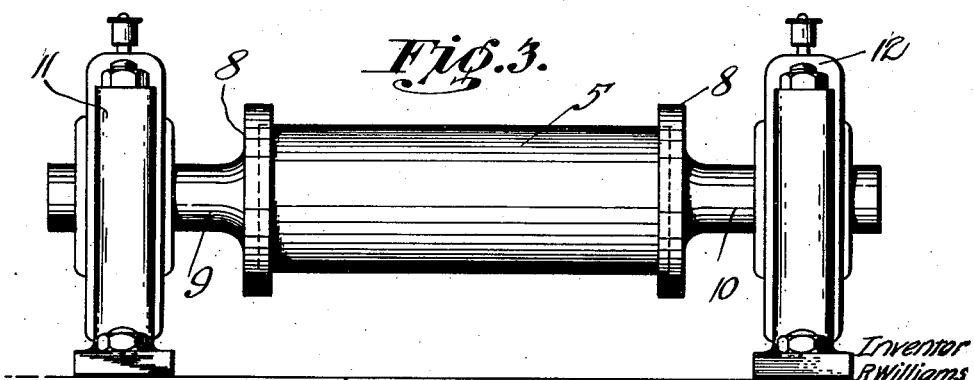

May 15, 1928.
R. WILLIAMS
1,670,013
MEANS FOR CENTRIFUGALLY MOLDING CONCRETE AND OTHER PIPES
Filed Feb. 19, 1925   3 Sheets-Sheet 2
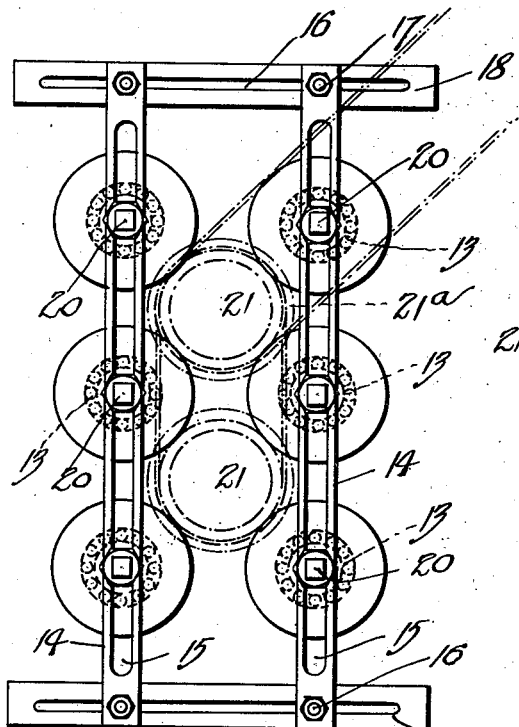
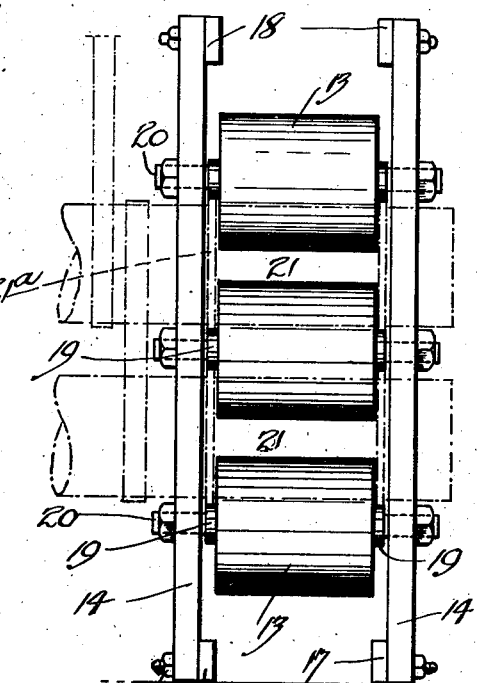
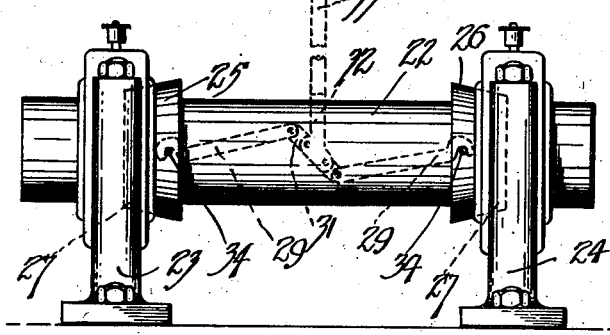
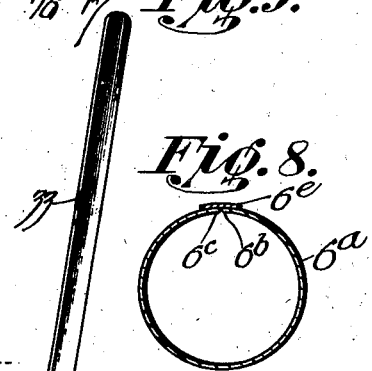
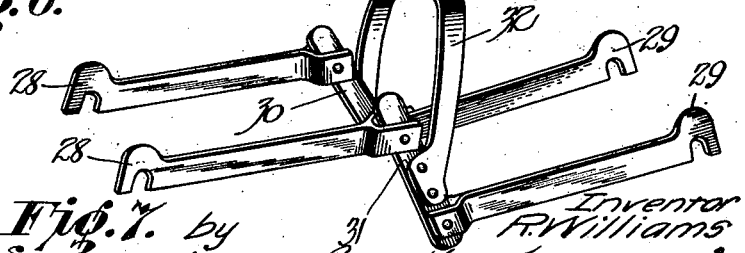

May 15, 1928.  1,670,013
R. WILLIAMS
MEANS FOR CENTRIFUGALLY MOLDING CONCRETE AND OTHER PIPES
Filed Feb. 19, 1925  3 Sheets-Sheet 3

Patented May 15, 1928.

1,670,013

UNITED STATES PATENT OFFICE.

RALPH WILLIAMS, OF RICHMOND, VICTORIA, AUSTRALIA.

MEANS FOR CENTRIFUGALLY MOLDING CONCRETE AND OTHER PIPES.

Application filed February 19, 1925, Serial No. 10,353, and in Australia August 26, 1924.

This invention refers to apparatus for centrifugally molding concrete and other pipes or shapes and has for its object to provide means for increasing the efficiency of molds of this type and also the means for suspending the mold to allow of its easy and rapid rotation.

The appliances at present in use are somewhat defective for the reason that it is not possible to spin the mold and consequently impart centrifugal motion to the material therein at a high speed and at the same time retain the mold or molds in a rigid position, that is to say, without lateral or endwise movement, nor is it possible to work on the pipe either for polishing or shaping after the water has been removed, and further, by closing the end or ends of the molds difficulty has been experienced in the feeding of the material thereto, and further, that owing to the impractibility of attaining high speeds a large amount of the finer particles of cement is lost in spinning.

This invention has been devised in order to overcome the existing defects and has for its object means whereby the molds are spun at high speeds, are maintained in a rigid or positive position, and the mold or mold casings are so disposed that the ends are open to perform the dual function of allowing the easy feeding of the material to the molds and after the water has been removed allowing of the working of the shape for shaping.

The basic principle underlying this invention consists in the spinning of the molds and consequently the material therein at a considerably higher velocity than hitherto obtained so that the centrifugal force causes the water in the material to come through without any fine particles of the material, and owing to such speed, the water is delivered in a very finely divided state, thus leaving in the pipe or shape all the fine cement which hitherto has been carried away in what is known as the slurry, with the result that the full cementing value is retained and a greater cohesion is effected between the particles, and consequently, a greater density in the mass is obtained, the higher forces allowing a considerably drier mixture of concrete being employed, thereby approaching ideal conditions of mixing.

An essential feature embodied in the invention consists in completely or partially surrounding the mold or mold casing in or on ball or other anti-friction bearings for the purpose of enabling the function above described to be accomplished.

A further essential feature consists in the mounting of a plurality or train of molds on ball races or mounted so that in driving one of the molds, the other molds in the train will rotate, or each mold may be driven separately at the same speed or any speed desired, the bearings running in pathways formed on or fitted to the mold casing to maintain the same in a positive position for the purposes herein described.

A further essential feature consists in disposing a cage member with mold casing, so as to support the mold and product when withdrawn from the machine, such cage member being housed within the mold casing in a manner which will allow of rotating the whole internal fitment of the mold. It may not be necessary to include the above cage member when casting shapes of short length but when long length members are being cast, it is necessary to support the finished product in some way to prevent fracture or distortion when same has been withdrawn from the molding operation.

In order to more readily understand the invention reference will now be made to the accompanying drawings in which:—

Figure 1 is a view in end elevation showing apparatus constructed according to my invention.

Figure 2 is a side elevation thereof.

Figure 3 is a view in side elevation showing an alternative apparatus for molding pipes.

Figure 4 shows in end elevation an alternative construction of apparatus for molding pipes Figure 5 is a side elevation thereof.

Figure 6 is a view in side elevation of means for holding a mold or mold casing in ball or other anti-friction bearings.

Figure 7 is a perspective view of a tool for use in the construction shown in Figure 6.

Figure 8 is a sectional view of the preferred construction of molds.

Figure 9:
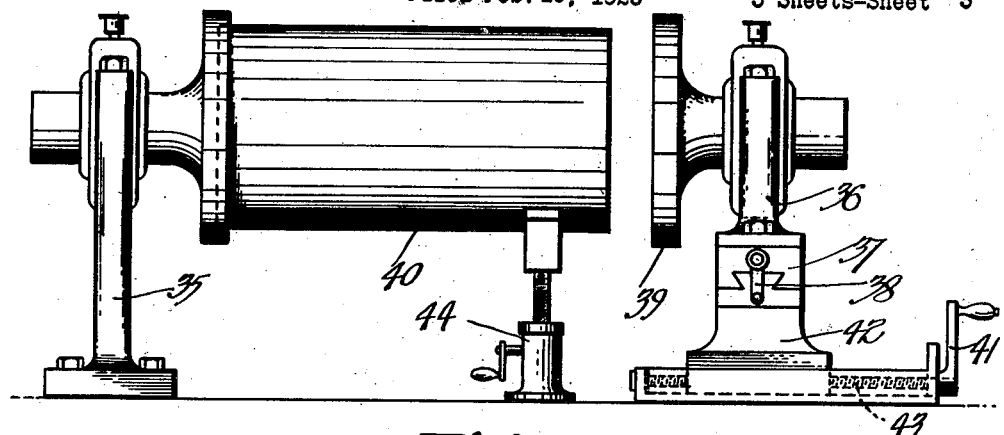
Figure 9 is a view showing means for disclosing one end of a mold for filling purposes.
Figure 10:
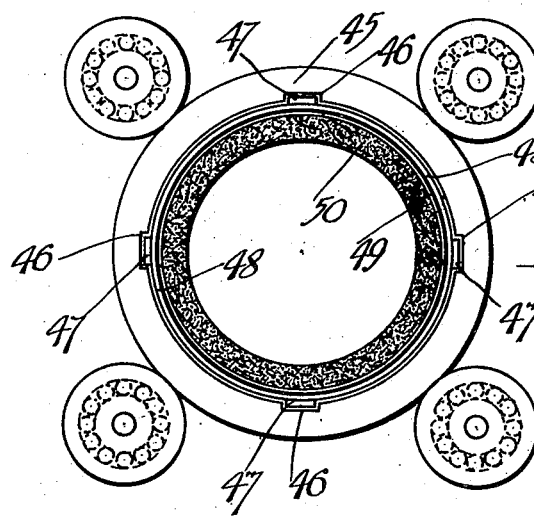
Figure 10 is an end elevation of a mold casing adapted to receive a supporting cage, which is shown in position.
Figure 11:
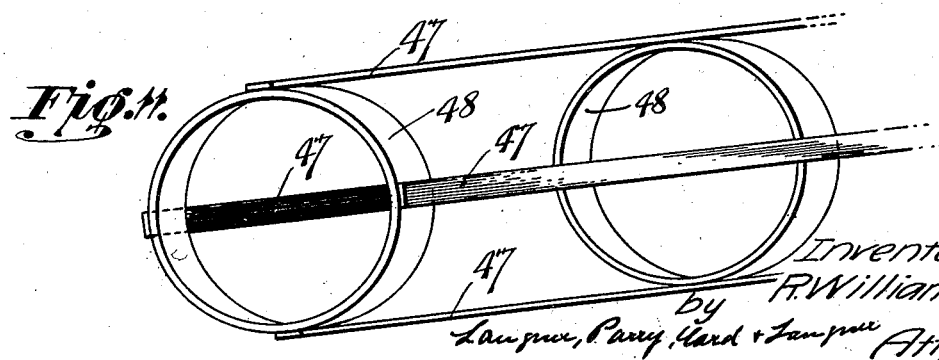
Figure 11 is a fragmentary perspective view of cage.

According to this invention, I provide a casing 5 of a length suitable for the length of the pipe it is desired to make and this casing 5 accommodates a mold 6 which may be split longitudinally at one side and which is pressed into the casing 5 and receives the cement or other material from which the pipe is to be made, the object of splitting the mold 6 being to allow of its easy removal from the finished product, and, further, when a solid mold is used it is preferred to form it in the manner shown in Figure 8 wherein the walls 6ª of the mold are curved so that the abutting sides 6ᵇ, 6ᶜ meet and are covered by means of a strip 6ᵉ which is sweated or otherwise affixed thereto. By this means a perfectly made joint is obtained which prevents the egress of the finer particles of material in the mass, and in so doing considerably strengthening the finished product produces an even external surface of the shape, and in order to remove the shape, a hot iron or implement is passed along the jointing strip 6ᵉ and releases from the mold by allowing it to expand.

The casing 5 is disposed within ball or other bearing 7 which may be two or more in number, and these bearings may be positioned at any suitable interval about the length of the casing 5, and form an essential characteristic of the invention.

Any portion of the casing 5 may be used as the surface for receiving a belt or other means for revolving said casing and contents, the material being fed into the mold disposed within said casing by any suitable means such as a hopper or chute in communication with a source of supply.

In Figure 4 I show an alternative apparatus for molding pipes in which I employ a number of ball bearings 13 which are adjustably carried in vertical stanchions 14 by slotting said stanchions 14 at 15.

These stanchions are also adjustable laterally by passing bolts 16 therethrough and into slotted beams 17 and 18.

Where the spindles 19 of the ball bearings 13 pass through the stanchions 14 they are preferably square so as to prevent as far as possible any rotation on the part of the spindles 19, and further, in order to maintain the ball bearings 13 in a definite position for working, I bore out the ends of the spindles 19 where they pass into slots 15 of the stanchions 14 and arrange plates to bridge the slots 15 in the stanchions and then insert studs 20 into the spindle ends which are thus drawn tightly against the stanchions 14.

The molds 21 or mold casings are disposed between the ball bearings 13 as shown by dotted lines, and the means for driving the apparatus may consist in passing a belt about the mold or mold casing disposed uppermost, and then passing a belt about the lower mold from the upper mold to effect the rotation thereof.

In order to maintain the molds or mold casing in a rigid or positive position without end or longitudinal play, the mold casing 21 is provided or fitted with flanges or collars 21ª spaced from each other to form a pathway for the ball bearings 13 so as to maintain the molds in the said position.

I would employ two or more of the constructions shown in Figures 4 and 5, one being disposed at each end of the mold or mold casings 21 and if molding a pipe or column of great length, I may employ one or more intermediate supporting devices to prevent the sagging of the mold and consequent distortion of the finished product.

Figure 3 shows a modification wherein the casing 5 is supported at each end by means, of recessed collars 8, from the centre of which protrudes stub axles 9, 10 passing into the ball races 11, 12, disposed at each end thereof.

The stub axles 9, 10 are hollow to allow of the feeding of the material to the inside of the mold 5 and it is to be understood that the mold is spinning prior to feeding the material thereto. However, if necessary or desirable, I may employ means as illustrated in Figure 9 to allow filling the mold or withdrawing the finished product therefrom, the means for allowing this operation consisting of a fixed ball race support 35, and a movable ball race support 36 which is carried on a table 37 capable of sliding to and fro by means of a handle 38, while the whole apparatus constituting the collar 39, ball race support 36 and table 37 may be moved clear of the mold 40 by means of the handle 41 engaging the table 42 by means of the feed screw 43 which passes through a screwed hole in the table 42 so that on the actuation of the handle 41, the whole apparatus described is moved clear of the mold 40, and then the handle 38 may be operated to move the collar 39 out of alignment with the mold 40 thus allowing free access to the mold 40, but prior to effecting this operation, means such as a jack 44 is positioned under the mold support to support the end prior to removing the collar 39.

Figure 6 shows a means for holding a mold 22 or mold casing in ball or other antifriction bearings 23—24 to prevent the loss of driving efficiency due to possible slipping of the mold 22 or mold casing in the bearings 23 and also to allow of the easy withdrawal of the mold 22 or mold casing from the bearings 23 and 24 when the centrifugal action has performed the necessary function, and in order to provide for this I propose to use tapered collars 25 and 26 which are slidably arranged on the mold 22 or mold casing.

These collars 25 and 26 pass into a tapered recess 27 in the ball or other housing of bearings 23 and 24 and will revolve therewith.

In order to effect the necessary engagement and disengagement of the collars 25 and 26 with the tapered recesses 27 of the bearings 23, 24, I use a tool as shown in Figure 7 comprising hook members 28 and 29 which are pivoted to spaced parallel links 30 and 31 whilst permanently mounted to the links 30 and 31 is a saddle bar 32 formed with a handle or lever 33. The mold casings are open at the ends to allow of the easy feeding of the material and also owing to the rigid mounting allow the work to be polished or shaped after the water is thrown clear.

In operation, the device described is placed over the mold or mold casing 22 as shown in dotted lines Figure 6 and the hooked members 28—29 engaged with studs 34 on each side of the tapered collars 25—26, and by moving the lever 33 to right or left the engagement or disengagement of the collars 25—26 with the recesses is effected, and the tool may then be removed to allow of the rotation of the mold.

When it is desired to withdraw the mold or mold casing 22 from the bearings 23—24 the collars are released as described and the mold withdrawn from the bearings, and if necessary, in order to prevent the collars 25—26 from becoming displaced from the bearings 23—24, the tool shown in Figure 7 could be engaged with said collars to hold them in position until the mold or mold casing 22 was re-conditioned.

When molding pipes or shapes of great length or of a length which would cause the finished product to fracture or become distorted were the product withdrawn from the mold immediately, the centrifugal action had done the required work, but before the cement had set sufficiently to allow of handling the pipe or shape, I propose to overcome the liability of such happening by forming the mold casing 45 with a number of internal longitudinal slots or channels 46 which are adapted to slidably receive longitudinal bars 47 of a cage device, said bars 47 connecting rings 48 which are rigidly affixed thereto.

This cage is inserted in the mold casing 45 and carries the mold 49 which receives the charge 50 of concrete or other material.

The cage rotates with the mold casing 45 and supports the mold therein and after the centrifugal action has been employed for the required time, the mold casing is prevented from further rotation and the cage and its burden is withdrawn from the mold casing.

Therefore my invention consists in supporting a casing or mold or mold casing at two or more points of its length on rollers working in a pathway formed by flanges or collars on the mold, and adapting the surface of the casing as the means for driving it, forming said casing either solidly or centrally divided, disposing said casing in ball races passing a mold either expansible or fixed within said casing, and rotating said casing at the speed necessary to obtain full advantage of the centrifugal force, causing the water which is thrown to the centre to come through at such speed without any fine particles of the material, and owing to the speed, the water is delivered in a very finely divided state, thus leaving in the pipe all the fine cement which in the manufacture of other products by the use of centrifugal force is carried away in what is known as the slurry, furthermore, as there is not much variance in the density of the sand cement and rock, the full cementing value is retained in the process and the resultant product is of greater density than the products at present obtained.

It is known in cement work that the best results are obtained when the minimum amount of water is used in the mixing of the cement and other materials used in the formation of concrete such amount of water setting up the required chemical action, so that although the material used may be substantially drier than those at present employed, yet under such high speeds as I attain with my apparatus, the water content is thoroughly passed through the contents in the mold and delivered to the inner surface of the finished product in a finely divided state, after impregnating the cement and other bodies with the moisture required to obtain the necessary cohesion therebetween.

I desire it to be understood that the bearings on which the mold or mold casing is mounted may be anti-friction bearings of suitable construction, such as roller bearings or a combination roller and ball bearing provided it will allow of the speed to create the centrifugal force necessary to produce the results above described.

What I claim as my invention and desire to secure by Letters Patent is:—

1. An improved apparatus for the molding of concrete and other shapes including means for retaining a mold member within the rotatable portion of an anti-friction bearing, said means comprising tapered collars slidably arranged on said mold member adapted to enter tapered recesses in the rotatable portion of the anti-friction bearing as described.

2. An improved apparatus for the molding of concrete pipes, the combination with a mold or mold casing disposed in antifriction bearings, of slidable collars, having tapered peripheral surfaces and studs on each side of said collars which are adapted to receive hooked members of a tool for moving said collars towards or away from each other for the purposes specified.

3. Improved apparatus for the molding of pipes and other shapes comprising a mold casing having a number of longitudinal slots or channels formed in the inner face thereof, adapted to receive longitudinal bars of a cage member which is adapted to support a mold casing and its burden during the process of molding and for supporting the product when drawn from the mold.

Signed at Melbourne, Victoria, Australia, this 24th day of November, 1924.

RALPH WILLIAMS.